Sept. 13, 1949.	S. HILLER, JR	2,481,745
HELICOPTER

Filed Feb. 21, 1944	6 Sheets-Sheet 1

INVENTOR.
STANLEY HILLER JR.
BY Charles M. Fryer
ATTORNEY.

Sept. 13, 1949.   S. HILLER, JR   2,481,745
HELICOPTER
Filed Feb. 21, 1944   6 Sheets-Sheet 3

INVENTOR.
STANLEY HILLER JR.
BY Charles M. Fryer
ATTORNEY.

Sept. 13, 1949.	S. HILLER, JR	2,481,745
HELICOPTER
Filed Feb. 21, 1944	6 Sheets-Sheet 4

INVENTOR,
BY STANLEY HILLER JR.
Charles M. Fryer
ATTORNEY.

Sept. 13, 1949.  S. HILLER, JR  2,481,745
HELICOPTER
Filed Feb. 21, 1944  6 Sheets-Sheet 5

INVENTOR,
STANLEY HILLER JR.
BY Charles M. Fryer
ATTORNEY.

Fig. 9.

Patented Sept. 13, 1949

2,481,745

UNITED STATES PATENT OFFICE 2,481,745

HELICOPTER

Stanley Hiller, Jr., Berkeley, Calif., assignor, by mesne assignments, to United Helicopters, Inc., Palo Alto, Calif., a corporation of California Application February 21, 1944, Serial No. 523,181

6 Claims. (Cl. 170—135.24)

This invention relates to the structure and controls of helicopters which, as is well known, are actuated by horizontally rotating wings and do not require a minimum forward speed to attain buoyancy or steering control.

A helicopter having a single set of wings, or more sets rotating in the same direction, will rotate about the axis of the wings due to the torque resulting from driving them, in the absence of means to avoid such counter-rotation. This difficulty has been avoided in practice by having a projecting part such as a tail, on the helicopter, with an air propeller thereon to exert a force to compensate for the torque. This has resulted in consumption of power which in no way adds to the buoyancy or speed of the helicopter, and it has been considered a necessary loss. In helicopters having wings rotating in one direction only, those moving forwardly on one side of the helicopter in the direction of movement of the helicopter will have greater speed with respect to the air than wings moving backwardly or rearwardly on the other side thereof, and the wings will thus have a greater bite on the air when moving in such forward direction than when moving in such rearward direction. This has resulted in undesired effects on the helicopter. To decrease such effects, it has been customary to pivot the rotating wings so that they could rise or fall angularly about the pivot points in planes including their axes of rotation; and stop members have been provided to limit the pivoting, generally to an angle of about thirty-five degrees (35°). The wings flapped automatically due to their changing bites, rising at one side of the helicopter and falling at the opposite side thereof, centrifugal force tending to throw them out toward the horizontal, this imparting the lift to the body. Such flapping action of the wings made it impossible to have closely adjacent, oppositely rotating, coaxial wings because they would collide with each other when they flapped.

Objects of my invention are to avoid useless torque effects; to cause torque in the correct amount in the correct direction for the correct period of time to turn or orient the craft; to provide means to cause the wings which rotate substantially horizontally to have varying effects on the air as they rotate; to control and make use of the different effects for moving the craft forward, backward, to either side, up, down, or in any desired combination of directions, either with or without turning it; to provide means which will afford universal controls of the craft; to provide means to afford such universal controls without changing the speed of rotation of the wings, if so desired; to make the actuating means for all of the controls easily available to the operator; to provide a helicopter having closely adjacent oppositely rotatable coaxial wings which are not tiltable with respect to their axis of rotation, which axis is fixed with respect to the body of the helicopter; to provide a helicopter having wings rotatable at constant speed, while affording universal and easy control; and other objects will be apparent after reading this specification.

Wings rotating in opposite directions about a common axis neutralize the torque effects of each other if balanced, and the forces exerted by them are then used solely for causing buoyancy and/or the intended motion of the helicopter. The wings have a certain effect on the air to exert force thereon, and such effect is herein termed "bite." The bite of a rotating or in fact any blade or wing on the air is a function of the tilt or pitch thereof, the speed thereof with respect to the air, the shape thereof, and possibly of other factors as well. Increasing such speed, or decreasing it as for example by means of a brake on the rotating shaft thereof, or otherwise, or change of pitch or shape of the wing, or possibly changes in other factors, will change the degree of bite. With the bite of each of the oppositely rotating wings increasing gradually to a maximum at the same point in the cycle of rotation and decreasing to a minimum at a point one hundred and eighty degrees (180°) opposite that point, the whole helicopter will be lifted more at the point of maximum bite and less at the point of minimum bite. The force exerted will then tend to move the helicopter obliquely away from the earth. Such force has a horizontal component and a vertical component, the horizontal component being in a direction from the points of maximum to minimum bites. The helicopter will move in a horizontal direction if the force exerted thereon by gravity just neutralizes the vertical component; and it will move obliquely up or down if the force of gravity is less than or more than the vertical component, respectively. The obliqueness of the path of the helicopter and its speed in that path can be controlled by controlling the total pull of the rotating wings and the tilting effect thereof, and these may in turn be controlled by adjusting the sum of the total maximum bites of the rotating wings and the amount of change of the bites during rotation. By changing the point of maximum bite to another location on the circle of rotation of the wings, the helicopter can be made to move in a direction having a different horizontal component, in any direction that may be chosen. Thus, the helicopter can be made to move in any desired horizontal direction, in any desired oblique direction, vertically up or down, or held stationary at any point in the air.

It will thus be apparent that the helicopter can be held stationary at any point or moved in any chosen direction in three dimensions, at any desired speed within the limits of the power supplied, no matter in what horizontal direction the helicopter may be pointed, so that it may move forwards, backwards, to either side, or in any intermediate direction. Upsetting the equilibrium between the opposite torque effects of the oppositely rotating wings will cause the body of the helicopter to rotate about the axis of the rotating wings in either desired direction, whether the helicopter be held suspended at one point or be moving in any direction. This is accomplished in any suitable manner by any suitable means, it being preferred to do so by adjustment of the bites of the oppositely rotating wings. It is now apparent that full control of the bites of each set of oppositely rotating wings as described above, will result in complete and universal control of the helicopter while it is upright or substantially so. Control of the bites may be had in various ways, as by controlled change of speed of rotation of the individual sets of oppositely rotating wings, by controlled bending of the wings or otherwise changing the shape thereof by means of ailerons thereon or otherwise, or by controlled adjustments of the tilt or pitch of the rotating wings, and there may be other ways and means of controllably adjusting the bites. For practical purposes, I prefer change of pitch.

The preferred exemplification of the invention is illustrated on the accompanying drawings forming a part of this specification, on which

Figure 1:
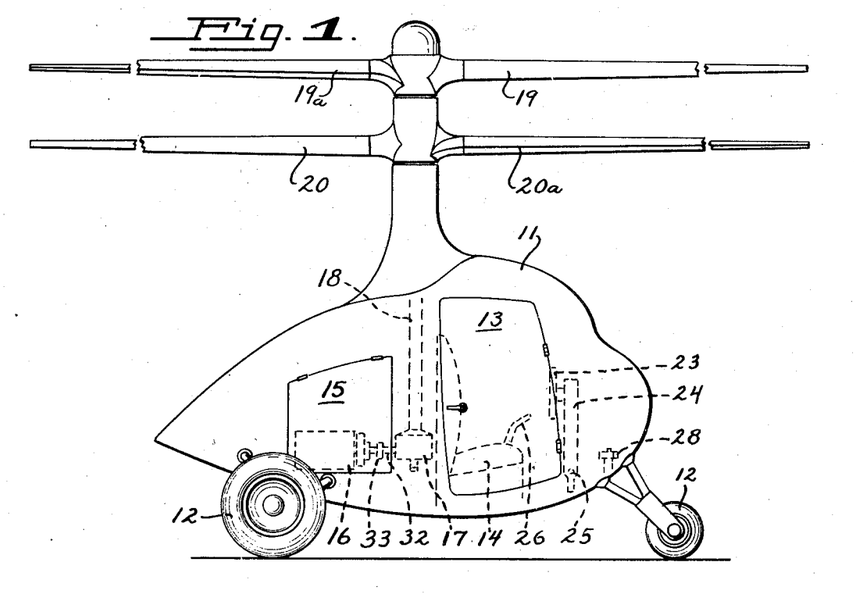
Fig. 1 is a right-hand side elevation of my helicopter.
Figure 2:
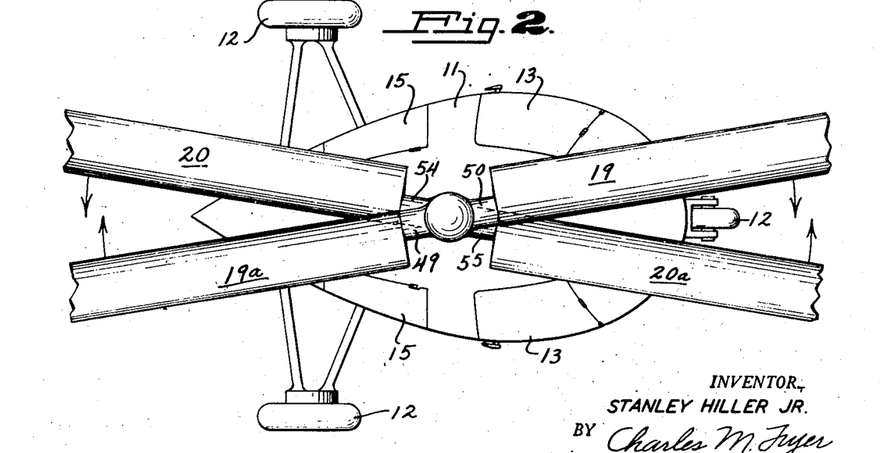
Fig. 2 is a top plan view thereof with parts broken away.
Figure 3:
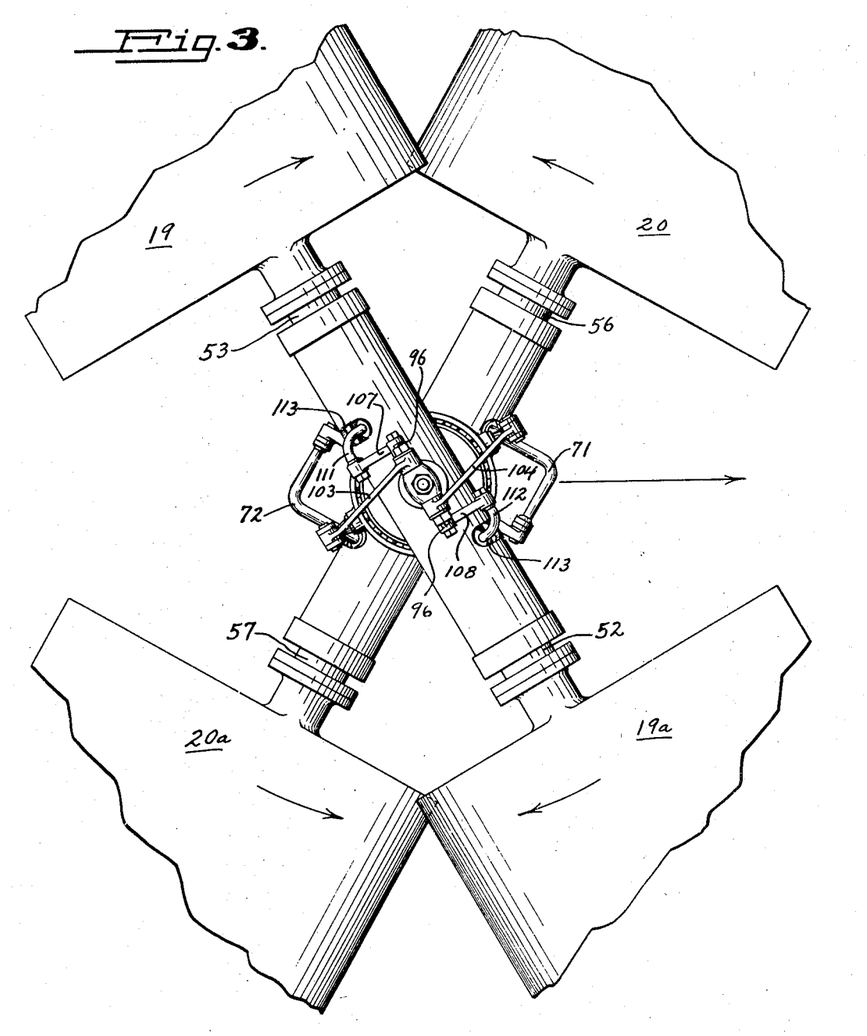
Fig. 3 is a top plan view with parts broken away.

My helicopter, as seen on Fig. 1, comprises a body 11, with more or less conventional landing gear 12 thereon. Any type of landing gear, for landing on the ground, on a roof, or on the water, may be used. A door 13 is provided to permit of entrance to and exit from the seat 14, and another door 15 is preferred to give access to the engine 16, which, through suitable gearing within the gear casing 17, drives two concentric hollow shafts partly within the hollow column or casing 18 which forms an extension of the gear casing. Such shafts, through suitable gearing, drive, one the upper set of rotating blades 19, 19a, and the other the lower set of rotating blades 20, 20a, in opposite directions. Various controls of the pitches of the upper and lower blades are actuated by means located conveniently and within easy reach of the pilot while sitting on the seat 14. As seen on Figs. 1 and 9, such actuating means comprise a wheel 23 mounted on a control post 24 in turn mounted on a pivot 25 to tilt forwardly or rearwardly, a hand operated lever 26 mounted on a pivot 27, and a foot operated lever 28 mounted on a pivot 29. The upper and lower sets of wings are rotatable in opposite directions, it being immaterial which rotates clockwise. Merely by way of example, the upper set is shown as rotatable clockwise when looking down.

Figure 7:
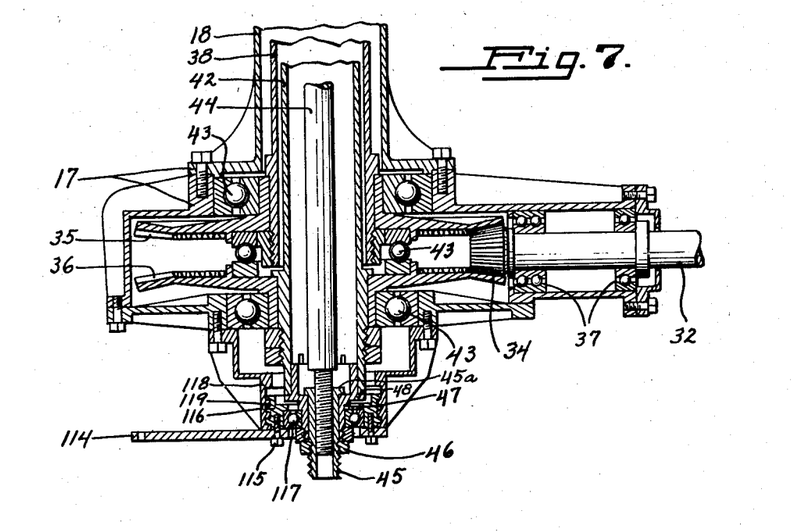
Fig. 7 is a vertical section of the lower part of the control column.
Figure 8:
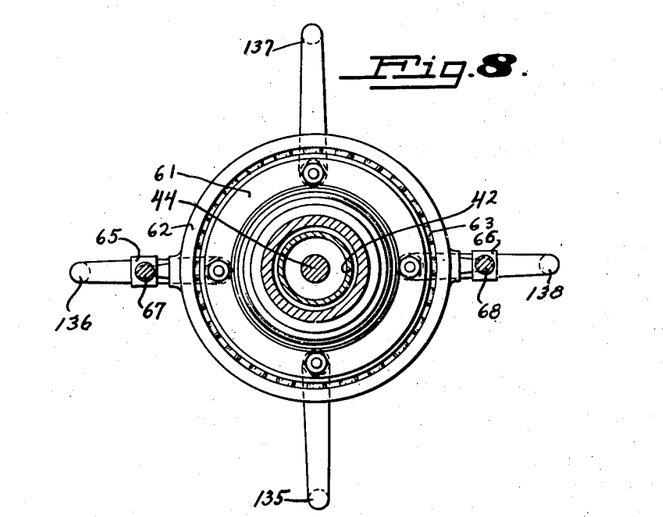
Fig. 8 is a horizontal section on the line 8—8 on Fig. 4.

A drive shaft 32 (Figs. 1 and 7) is driven by the engine 16, with a clutch 33 interposed to permit running the engine without rotating the wings when desired. On the drive shaft 32 is a bevel gear 34 which meshes with upper and lower gears 35, 36 respectively. The shaft 32 rotates in ball or other suitable bearings 37. The gear 35 is attached to a hollow shaft 38 which is within the column or casing 18, and the gear 36 is attached to a hollow shaft 42 which is within the hollow shaft 38. The gears 35 and 36 are mounted to rotate in ball bearings 43. The hollow shafts 38 and 42 are thus rotated in opposite directions by the drive shaft. A rod 44 is within the hollow shaft 42, the lower end of which is threaded within a flanged hollow interiorly threaded bolt 45 having a flange 45a. A nut 46 fastens the bolt 45 to a sleeve 47. The upper end of such sleeve is within and splined to the hollow shaft 42 at the lower end thereof. The sleeve and consequently the rod 44 thus rotate with and are movable longitudinally of the hollow shafts 38 and 42. A stop member such as a flange 48 strikes against the lower end of the shaft 42 and limits the upward movement of the rod with respect to such shaft, the uppermost position being shown on Fig. 7. Means are provided to move the rod longitudinally with respect to the hollow shafts, which will be referred to hereinafter.

Figure 6:
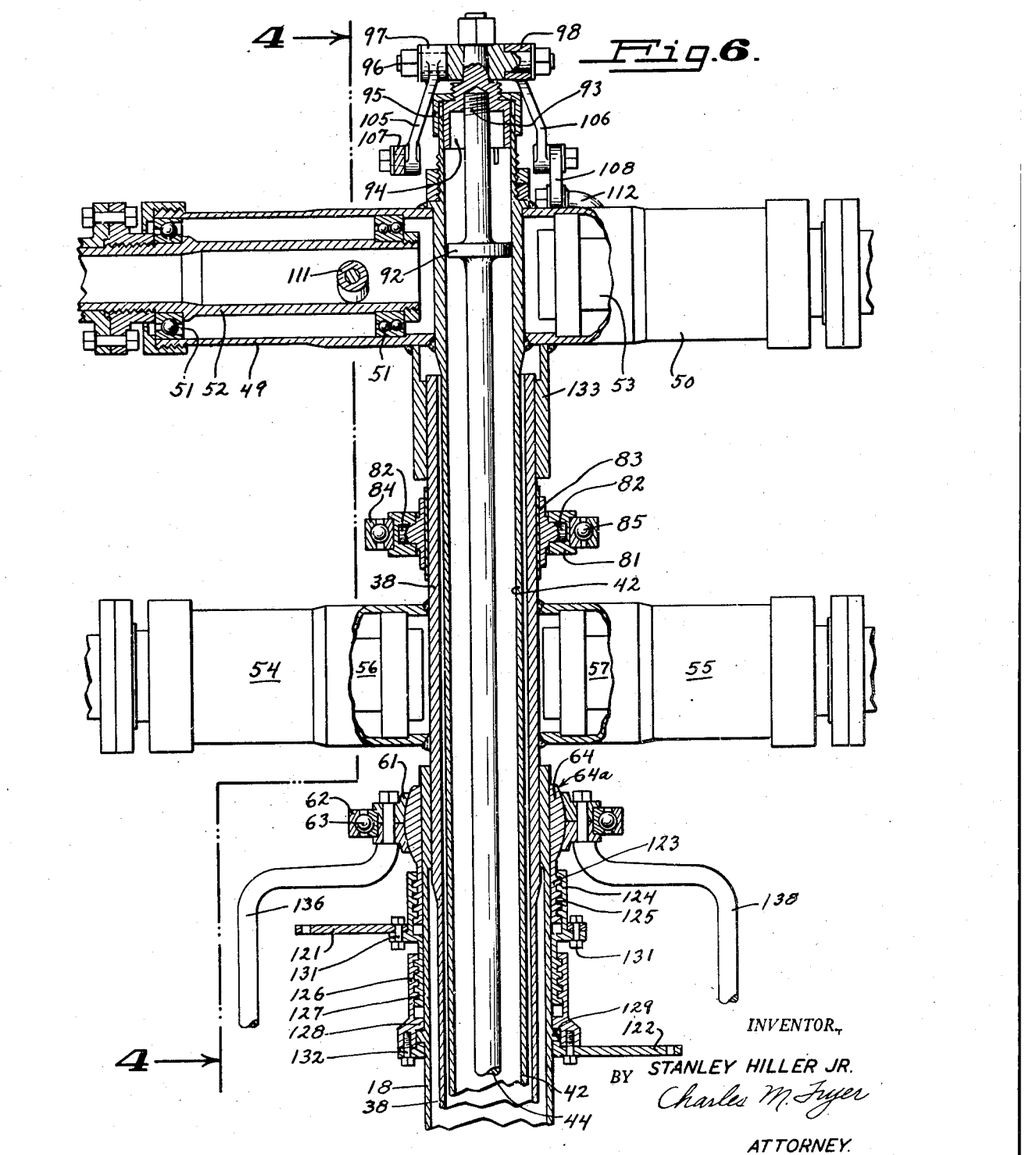
Fig. 6 is a vertical section of the upper part of the control column.

Similar hollow arms 49, 50 (Fig. 6) are fixedly mounted on the hollow shaft 42 to rotate therewith. Mounted for rotation within the hollow arms, by means of ball bearings 51, are hollow shafts 52, 53 respectively. The wing 19 is mounted on the hollow shaft 53, and the wing 19a is mounted on the hollow shaft 52. The pitch of these wings, that is, the angle at which they bite into the air, is changed and controlled by rotation of the hollow shafts 52, 53 on their axes. Similar hollow arms 54, 55 are fixedly mounted on the hollow shaft 38, within which are hollow shafts 56, 57 respectively, similar to the shafts 52 and 53 and similarly mounted. The wing 20 is mounted on the shaft 56 and the wing 20a on the shaft 57. The pitch of these wings is similarly changed and controlled by rotation of the shafts 56 and 57 on their axes. The shafts 52 and 53 will be rotated oppositely to each other to increase, or decrease, the pitch of both wings 19 and 19a, as the case may be, since such wings face in opposite directions. Likewise the shafts 56 and 57 will be rotated in opposite directions to increase the pitch of both wings 20 and 20a, or to decrease the pitch of both, since these wings also face in opposite directions.

I provide means to cause continuous change of pitch of the wings through a range, as they rotate. This comprises a wobble plate 61 (Fig. 6) which can be tilted in any direction and raised or lowered. A ring 62 is rotatably mounted on ball bearings 63 about the periphery of the wobble plate, this ring, together with certain connections for the pitch controls which are attached thereto, rotating with the lower wings 20, 20a. The wobble plate 61 is mounted on a support 64 having a spherical bearing surface 64a, as does the wobble plate, which permits tilting in any direction.

Figure 4:
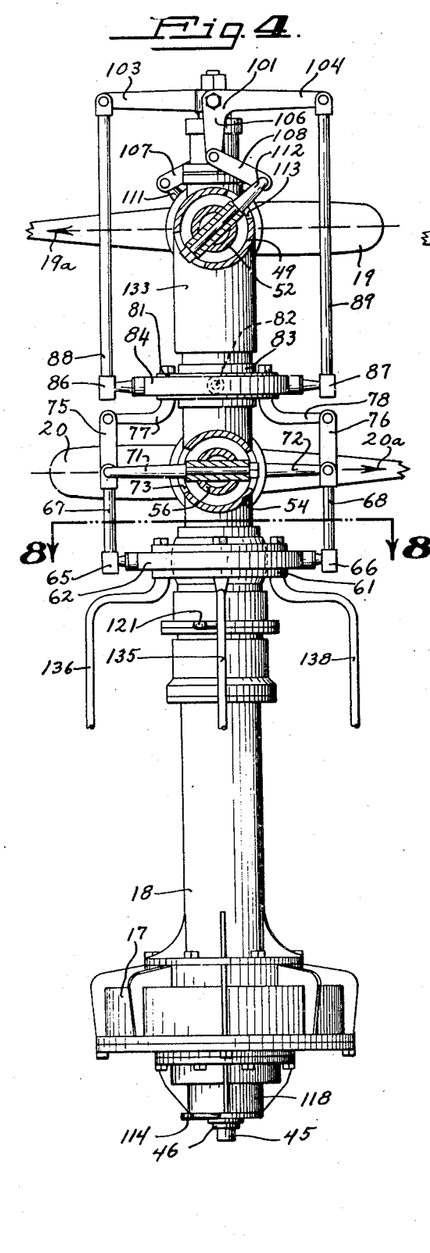
Fig. 4 is a side elevation of the pitch control mechanism, partly in section, and with the near wings removed, and is a section on the line 4—4 on Fig. 6.

Attached to the ring 62 by diametrically opposite ball and socket or other hinge-like connections 65 and 66, are upwardly projecting links 67 and 68. Extending crosswise of and obliquely from the shafts 56, 57 through slots as at 73 (Fig. 4) in the hollow arms 54 and 55, are bent arms 71, 72, the ends of which are pivotally attached to the links 67, 68 respectively. Also pivotally attached to the links 67, 68 are upwardly extending links 75, 76. Bent arms 77, 78 are fixedly connected to another wobble plate 81 and pivotally to the links 75, 76. The wobble plate 81 cannot wobble freely in any direction as can the wobble plate 61, but only about the axis defined by the pivot pins 82 on the ring 83 splined to the hollow shaft 38 so that it can move longitudinally thereof and rotate therewith; the axis of pivot pins 82 being perpendicular to the plane of linkage 67, 75, 77 and 68, 76, 78.

A ring 84 is mounted for rotation about the periphery of the wobble plate 81 by means, for example, of ball bearings 85. Pivotally attached to the ring 84 at points ninety degrees (90°) from the pivot pins 82, by ball and socket connections 86, 87, are upwardly extending links 88, 89.

Figure 5:
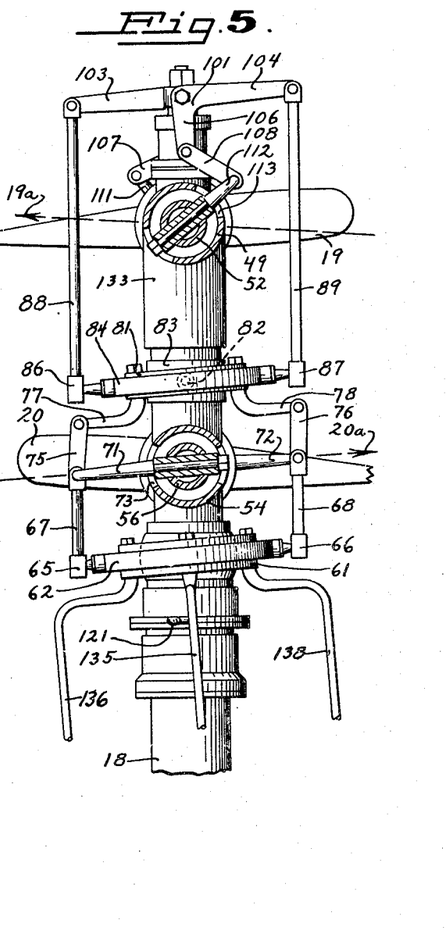
Fig. 5 is a view similar to that of Fig. 4 with the parts in different position.

The rod 44 has an enlarged circular portion 92 to center it within the hollow shaft 42. Attached to the upper end of the rod 44 and adjustable thereon by means of screw threads 93, is a cap 94 splined to the hollow shaft 42 to be rotatable and movable longitudinally therewithin. A flange nut 95 on the cap portion limits the downward movement of the rod 44 by striking against the upper end of the hollow shaft 42, the upward movement being limited by the flange 45a, as previously described. A pivot member 96 is attached to the cap, and bell crank levers 101, 102 are mounted at the angular portions thereof upon the pivot member 96. These bell crank levers have arms 103, 104 extending outwardly in opposite directions away from the pivot member 96, and also arms 105, 106 extending downwardly at opposite sides of the hollow shaft 42. The links 88, 89 are pivotally connected to the arms 103, 104. Pivotally connected to the downwardly extending arms 105, 106 of the bell crank levers 101, 102, are downwardly extending oblique links 107, 108 which in turn are pivotally connected to bent arms 111, 112 which extend through slots as 113 (Figs. 4 and 5) in the hollow arms 49, 50, and they are connected to the hollow shafts 52, 53.

The rod 44 thus provides an axially movable anchor for the linkage connected to the shafts 52 and 53 on which the upper wings are mounted; and such rod is raised by rotating a lever 114 (Figs. 1, 4 and 7) in one direction and lowered by rotating such lever in the reverse direction. It is attached as by bolts or screws 115 to an annular member 116 rotatable on a ball bearing 117. The outer face of the annular member 116 has coarse threads which register with similar threads on the inner face of the casing member 118, the registering threads being shown at 119. These threads are coarse so that rotation of the lever 114 through even a slight angle will cause the proper raising or lowering of the rod 44 to tilt wings as will be referred to hereinafter.

The wobble plate 61 is raised or lowered in a somewhat similar manner, but by two independent levers 121, 122. The support 64 for the wobble plate 61 has a downward extension 123, the outer face of which has coarse screw threads registering with similar threads on the inner face of the upper part of an annular member 124, the threads being shown at 125. The lower part of the member 124 has coarse screw theads on its outer face which register with similar threads on the inner face of an annular member 126, the threads being shown at 127. The member 126 is maintained at constant level with respect to the casing 18, for which purpose it is provided with an inwardly projecting flange 128 which, with the lever 122, forms a groove in which is a flange 129 on the casing 18. The lever 121 is attached to the annular member 124 by bolts 131; and the lever 122 is similarly attached to the member 126 by bolts 132. Thus, rotation of either of the levers 121, 122 will raise or lower the support 64 for the wobble plate 61 and this wobble plate itself axially of the casing 18.

The inner face of the upper end of the casing 18 forms a bearing surface for the hollow shaft 38, and the outer face of such casing forms a surface along which the member 64 can slide on rotation of either of the levers 121 or 122. Attached to and depending from the hollow arms 49 and 50 is an annular member 133 to form a bearing surface for the hollow shaft 38.

The upper wings 19, 19a rotate with the inner hollow shaft 42, and the lower wings 20, 20a with the outer hollow shaft 38, the shafts and wings thereon rotating in opposite directions. The ring 84 rotates about the upper wobble plate 81, along with the links 88, 89, the bell crank levers 101, 102 and parts appurtenant thereto, and the upper wings 19, 19a. The wobble plate 81 itself rotates in the opposite direction with the hollow shaft 38 and the lower wings 20, 20a, as do the ring 62 on the lower wobble plate and the links 68, 76 and appurtenant parts.

Arms 135, 136, 137, 138 (Fig. 9) are attached to the wobble plate 61 at ninety degrees (90°) apart. A flexible cable 140 is connected at its ends to the arms 136 and 138, and intermediate its ends it passes over pulleys 141 and over a pulley 143, and it is wound around a drum 144 fixed to the shaft 145 of the control wheel 23. The center of rotation of the pulley 143 is at the axis of the pivot 25. Turning the wheel 23 will cause tipping of the wobble plate 61 in the direction of the arms 136 or 138, the direction of tipping depending on which way the wheel 23 is turned. A flexible cable 146 passes over a pulley 147, and it is connected to the arm 137 and to the control post 24 at the point 148. A flexible cable 151 passes over a pulley 152, and it is connected to the arm 135 and to the control post 24 at the point 153. The control post 24 is mounted to tilt about the pivot 25, forwardly away from, or rearwardly toward, the pilot's seat, that is to the right or left respectively as seen on Fig. 9. Tilting the post 24 forwardly pulls on the cable 146 which pulls on the arm 137 to tilt the left side of the wobble plate 61 downwardly. The right side of the wobble plate 61 is thus tilted upwardly to cause the arm 135 to pull on the cable 151 to take up the slack in the cable 151 caused by the forward tilting of the control post. Tilting the control post rearwardly causes the right side of the wobble plate 61 to tilt downwardly and the whole operation is the reverse of that due to tilting the control post forwardly. The points 148 and 153 of attachment of the cables 146 and 151 are on opposite sides of the pivot 25 and are so chosen that a pull on either of such cables will take up the slack caused thereby in the other. The wobble plate 61 can be tilted in any desired direction and to the desired degree by properly coordinating the rotation of the wheel 23 and the tilting of the post 24.

Figure 9:
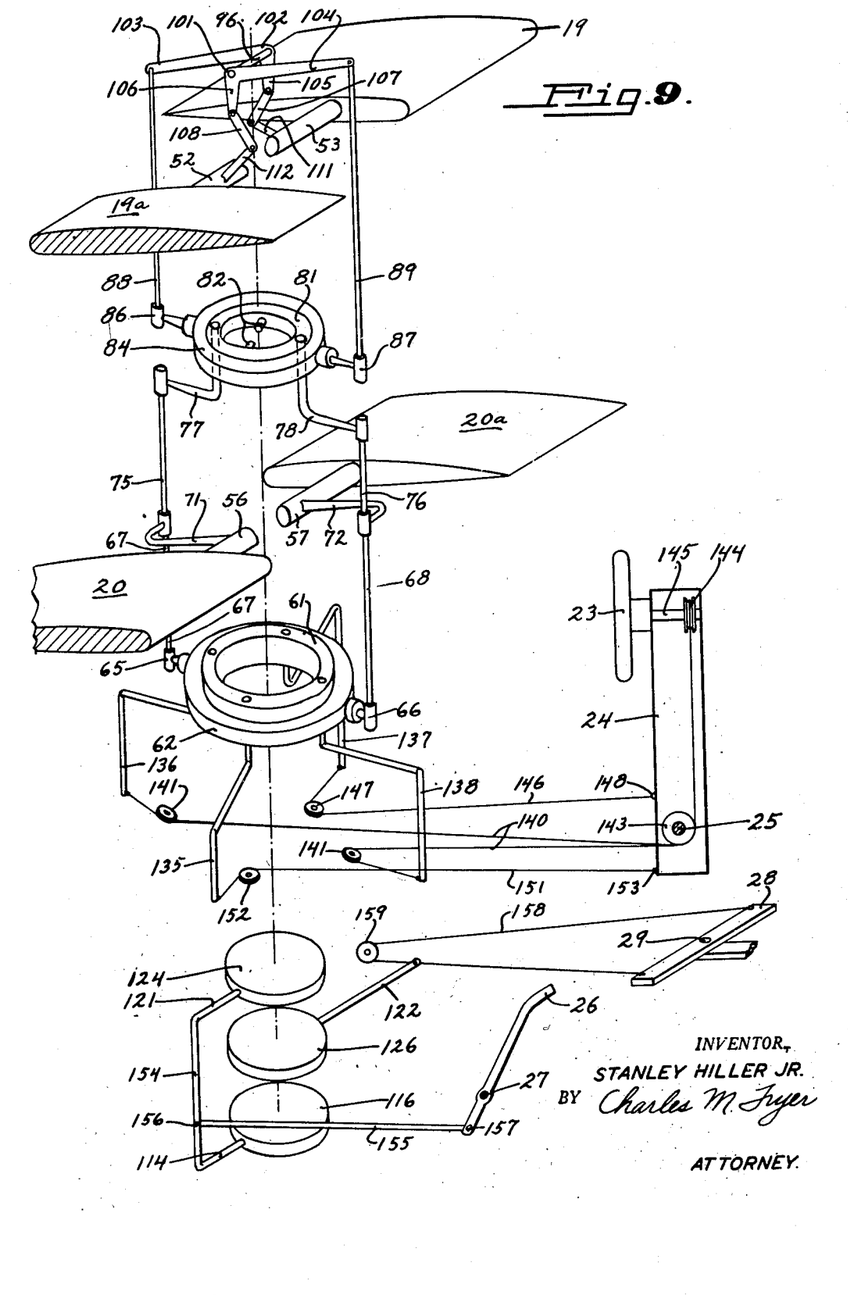
Fig. 9 is a diagrammatic view of the controls.

The levers 114, 121 and 122 are rotated by the hand operated lever 26 and the foot operated lever 28, as shown diagrammatically at the lower part of Fig. 9. The levers 114 and 121 are rotated in unison by the hand lever 26, and with this in view they are shown as connected together in fixed relation to each by a rod 154 to which a link 155 is connected by pivot means 156, such link being connected to the hand lever by pivot means 157. Operation of the hand lever causes the levers 114 and 121 to rotate together, in either direction as desired. The lever 122 is connected to a cable 158 passing about a pulley 159, the ends of the cable being attached to the foot lever 28 at opposite sides of the pivot 29 thereof. Movement of the foot lever does not cause appreciable slack in the cable 158, and forward movement of the left side of such lever causes the lever 122 to rotate rearwardly, while opposite movement of the foot lever causes the lever 122 to rotate forwardly.

The pitch of both the upper and lower wings varies continuously and gradually through a range at all times that the helicopter is flying in a direction having a horizontal component, and such range of change of pitch becomes zero and the pitch of both the upper and lower wings remains constant when the pull of the wings is merely straight up. The direction of tilt of the lower wobble plate 61 controls the wobbling of the upper wobble plate 81 and determines the point, which is the same in each revolution, at which both the upper and lower wings have the greatest pitch and the point in each revolution in which they have the least pitch. Either of these points can be chosen at will anywhere in the path of rotation, the other point being one hundred and eighty degrees (180°) therefrom. The helicopter as a unit travels in a horizontal direction which is the same as that from the point of greatest to the point of least pitch. Raising the lower wobble plate 61 raises the upper wobble plate 81 (and vice versa) and increases the pitch of the upper wings and decreases the pitch of the lower wings, while lowering the wobble plate will do just the reverse. This causes a change in the torque effect and the turning of the body of the helicopter to orient it. Raising the rod 44 decreases the pitch of the upper wings without affecting the pitch of the lower wings, and lowering the rod 44 increases the pitch thereof, also without affecting the pitch of the lower wings. The effect on the pitch of the upper wings of raising the rod 44 is made equal to about twice that of the effect thereon of raising the wobble plate, so that when both the wobble plate and the rod are raised or lowered together, there is a simultaneous and equal decrease or increase in the pitches of both the upper and lower wings. Hence, rod 44 serves as an altitude or collective pitch control member.

The control post 24 is pushed forwardly to make the helicopter move forwardly and it is pulled rearwardly toward the pilot to make the helicopter move backwardly. The wheel 23 is turned to the left, that is, counterclockwise looking at it from the pilot seat, to make the helicopter move sidewise to the left without turning the body, and the wheel 24 is rotated to the right to make the helicopter move off sidewise to the right without turning the body. Proper coordination of the wheel 23 and the post 24 will make the helicopter move in any desired horizontal direction. The left end of the foot lever 28 is pushed forwardly to rotate the body of the helicopter to the left about the vertical axis of the rotating wings, and the right end of such foot lever is pushed forwardly to cause the helicopter to rotate similarly to the right. The hand lever 26 is pulled up toward the seat to increase the altitude of the helicopter, and it is pushed down away from such seat to decrease its altitude, it, of course, being understood that there is a point in the position of the hand lever intermediate between ascent and descent at which the helicopter can be maintained at constant level or even stationary in the air.

Pushing forwardly on the wheel 23 to tilt the control post 24 forwardly exerts a pull on the cable 146, which, in turn, pulls the lower end of the arm 137 towards the pulley 147, and thereby tilts the lower wobble plate 61 to the left of the pilot sitting in his seat as seen on Fig. 9. The ring 62 thus rotates in an oblique path and thereby causes the upper wobble plate 81 to wobble as the wings rotate. With the parts in the positions shown on Fig. 9 and at each quarter rotation therefrom, the tilt of the lower wobble plate does not result in tilting the upper wobble plate, but in the positions ninety degrees (90°) therefrom, the upper wobble plate is at maximum tilt. There is a continuous gradual increase of tilt of the upper wobble plate from the points of minimum to maximum tilt thereof, and there is a continuous gradual decrease of tilt of such wobble plate from the points of maximum to minimum tilt thereof. Such continuous tilting of the upper wobble plate, due to the previously described connections thereof to the rotating wings, causes the pitch of both wings to decrease gradually and continuously as they move forwardly with respect to the direction of travel of the helicopter, and to increase gradually and continuously as they move rearwardly thereof. Thus, for example, with the greatest pitch of the blades directly at the rear of the helicopter, the helicopter tilts and moves forwardly.

Pulling on the wheel 23 to tilt the control post 24 rearwardly exerts a pull on the cable 151, and thereby pulls the lower end of the arm 135 toward the pulley 152 to tilt the lower wobble plate 61 in a direction which is the reverse of that just described, namely, toward the right of the pilot with the parts in the positions shown on Fig. 9. This places the point of maximum tilt of the blades at the forward part of the helicopter which is thereby tilted rearwardly and flies backwardly.

Turning the wheel 23 to the left, that is, counterclockwise as seen by the pilot from his seat, exerts a pull on that end of the cable attached to the arm 136 and pulls the rearmost end of the lower wobble plate down. This causes the upper wobble plate to wobble in such a manner that the pitches of the wings decrease gradually and continuously as they move to the left, and increase gradually and continuously as they move to the right. This causes the right side of the helicopter to rise higher than the left side, and the helicopter tilts toward the left side thereof and thereby moves sidewise to the left and without turning the body.

Turning the wheel 23 in the opposite direction, that is, to the right and clockwise as seen by the pilot from his seat, will cause the point of greatest pitch of the wings to be at the left side of the helicopter. This causes the left side of the helicopter to rise higher than the right side thereof. It tilts toward the right side and moves off in that direction.

It will be apparent that by coordinating the direction and amount of turning of the wheel 23 with the direction and amount of tilting of the post 24, the point of greatest pitch can be placed in any direction from the axis of rotation, and the helicopter can be caused to move horizontally in any direction without turning the body.

When the pilot with his feet on both ends of the foot lever 28 pushes the left end thereof forwardly away from the seat, there is a pull on the cable 158 which causes the lever 122 to rotate rearwardly, that is, counterclockwise looking down. This rotation of the lever 122, due to the intermeshing of the threads 127, causes the support for the lower wobble plate to rise. This causes the upper wobble plate to rise an equal amount since they rise or descend together, and this results in the upper wings having an increased pitch and the lower wings a decreased pitch. The bites of the upper and lower wings will be unequal and the bite of the upper wings will be the greater, thus causing a torque effect which causes the body 11 to rotate about the center of rotation of the wings in a direction opposite to that of the rotation of the upper wings. Pushing forward on the left end of the foot lever 28 thus causes the body to rotate to the left about the axis of rotation of the wings.

Pushing the right end of the foot lever 28 forwardly causes the wobble plates to descend and in turn the upper wings assume a decreased pitch and the lower wings an increased pitch. This causes a torque effect which causes the body to rotate about the center of rotation of the wings in a direction opposite to that of the rotation of the lower wings. Pushing forward on the right end of the foot lever 28 thus causes the body to rotate to the right about the axis of rotation of the wings.

It is preferable to have the changes in pitch of the upper and lower wings, for the purpose of rotating the body in either direction, balance each other so that the combined pulling or lifting power of both sets of wings will not be substantially changed. This permits of body rotation by a single control means without change of altitude, no matter whether the helicopter is moving horizontally or is stationary.

The handle of the lever 26 is pulled toward the pilot's seat to make the helicopter move upwardly axially of the center of rotation of the wings; and such lever is pushed forwardly away from such seat to make the helicopter descend axially of such center. Pulling such lever causes the levers 114 and 121 to rotate counterclockise as seen looking down on the helicopter. Such rotation of the lever 121 lowers the wobble plates, which increases the pitch of the lower wings and tends to decrease the pitch of the upper wings. Such rotation of the lever 114 raises the rod 44, which increases the pitch of the upper wings through its connections thereto, and overcomes the tendency toward decreased pitch of the upper wings due to lowering of the wobble plates. The increase in pitch of the upper wings due to the lever 114 should preferably be just great enough to make the actual increase in pitch of the upper blades substantially equal to the increase in pitch of the lower blades due to the lever 121, so that a torque differential will not be set up and the helicopter can rise without rotation of the body. In other words, the increase in pull of the upper blades due to the lever 114 should equal to the increase in pull of the lower blades due to the lever 121, and an additional amount equal to the loss of pull of the upper blades due to the lever 121. With the pulls of both the upper and lower blades increased the same amount, no torque effects are thereby produced and the total pull is increased which causes the helicopter to ascend.

When the handle of the lever 26 is pushed forwardly away from the seat to cause the helicopter to descend axially of the wings, the levers 114 and 121 are rotated clockwise. Such rotation of the lever 121 causes the wobble plates to rise and this causes the pitch of the lower wings to decrease and the pitch of the upper wings to increase. Such rotation of the lever 114 causes the rod 44 to be lower and this causes the pitch of the upper blades to decrease. The total decrease in pull of both the upper and lower blades is the same leaving them so that their torques neutralize each other. Descent along the line of the axis of rotation of the blade is therefore without undesired rotation of the body.

This invention affords the pilot control of two-dimensional horizontal movement of the helicopter by proper setting of the wheel 23 about its axis and proper setting of the post 24 about its pivot or axis. Control of movement in a third dimension is afforded by proper setting of the hand lever 26. Control of rotation of the body is afforded by proper setting of the foot lever 28. The pilot can keep both hands on the wheel 23 when change of altitude is not desired and he needs to remove only one hand therefrom to actuate the hand lever 26 for change in altitude. One hand can thus always hold the wheel 23. A grasp on the wheel 23 is sufficient to rotate such wheel in either direction, to tilt the post 24 in either direction or to hold either or both steady. Universal control of the helicopter is made possible and easy by the present invention, by properly coordinating the various controls, so long as the helicopter remains right side up. It would, of course, be possible during change of altitude by means of the hand lever 26 to have the oppositely rotating wings ordinarily produce unequal torque effects of which the algebraic sum would result in rotation of the body which might be controlled and overcome by use of the foot lever 28.

During operation, the lower wings bite into air that is moving downwardly because it has been forced downwardly by the upper wings, while the upper wings bite into fresh air that is unaffected by any wings. As a result, the lower wings require a greater pitch than the upper wings for both wings to have the same degree of bite and produce equal and opposite torque effects on the body. A fixed adjustment of the relative wing pitches can be made to offset this difficulty, or it can be offset by use of the orientation control 28, or by a combination of both. It is desirable to have the load, by its weight and position, offset the gravity effect of the engine, so that the helicopter will normally tend to assume an upright position. It is possible, however, to overcome any tendency of the helicopter to tilt due to weight distribution thereon, by use of the control wheel 23 and/or control post 24, at least to a degree.

Other variations of the invention are also possible. Different ways of coordinating the controls are possible. The specific methods heretofore described are the simplest and are preferred although many variations, including those referred to as well as others, fall within the broad scope and spirit of the invention.

I claim:

1. A helicopter comprising a hollow shaft rotatable about its axis, a wing, means supporting said wing for rotation with said shaft and for adjustment as to pitch, wobble mechanism adjustable axially along said shaft, means for effecting said axial adjustment of said wobble mechanism, a rod within said shaft adjustable axially with respect thereto, means for effecting said axial adjustment of said rod, and linkage connecting the wobble mechanism and the wing to adjust the pitch of said wing in one direction upon axial adjustment of said wobble mechanism alone, said linkage including a lever member pivotally connected to said rod whereby when said rod and said wobble mechanism are both simultaneously axially adjusted the pitch of said wing is adjusted in an opposite direction.

2. A helicopter comprising an outer hollow shaft and an inner hollow shaft within the outer shaft and projecting beyond an end thereof, said shafts being rotatable in opposite directions about a common axis; a wing secured to the projecting portion of the inner shaft for rotation therewith and pitch adjustment thereon; a second wing secured to the outer shaft for rotation therewith and pitch adjustment thereon; wobble mechanism between said wings axially adjustable along said axis including a collar connected to the outer shaft for axial movement along said shaft and rotation therewith, an inner ring tiltably supported by said collar, and an outer ring journalled on the inner ring; additional wobble mechanism below said second wing axially adjustable along said axis including a tiltable inner ring, and an outer ring journalled on such inner ring; linkage interconnecting the inner ring of the first mentioned wobble mechanism, the outer ring of the additional wobble mechanism, and the second wing; linkage anchoring means including a rod within said inner hollow shaft and which is axially adjustable along said axis; and linkage anchored on said rod and interconnecting the first mentioned wing and the outer ring of the first mentioned wobble mechanism.

3. A helicopter comprising an outer hollow shaft and an inner hollow shaft within the outer shaft and projecting beyond an end thereof, said shafts being rotatable in opposite directions about a common axis; a wing secured to the projecting portion of the inner shaft for rotation therewith and pitch adjustment thereon; a second wing secured to the outer shaft for rotation therewith and pitch adjustment thereon; wobble mechanism between said wings axially adjustable along said axis including a collar connected to the outer shaft for axial movement along said shaft and rotation therewith, an inner ring tiltably supported by said collar, and an outer ring journalled on the inner ring; additional wobble mechanism below second wing axially adjustable along said axis including a tiltable inner ring, and an outer ring journalled on such inner ring; linkage interconnecting the inner ring of the first mentioned wobble mechanism, the outer ring of the additional wobble mechanism, and the second wing; linkage anchoring means including a rod within said inner hollow shaft and which is axially adjustable along said axis; linkage anchored on said rod and interconnecting the first mentioned wing and the outer ring of the first mentioned wobble mechanism; and control means enabling simultaneous axial adjustment of said wobble mechanisms alone or simultaneous axial adjustment of said wobble mechanisms together with said anchoring means.

4. A helicopter comprising an outer hollow shaft and an inner hollow shaft within the outer shaft and projecting beyond an end thereof, said shafts being rotatable in opposite directions about a common axis; a wing secured to the projecting portion of the inner shaft for rotation therewith and pitch adjustment thereon; a second wing secured to the outer shaft for rotation therewith and pitch adjustment thereon; wobble mechanism between said wings axially adjustable along said axis including a collar connected to the outer shaft for axial movement along said shaft and rotation therewith, an inner ring supported by said collar for tilting movement about an axis fixed with respect to said collar, and an outer ring journalled on the inner ring; additional wobble mechanism below said second wing axially adjustable along said axis including a collar adjustable along said axis, an inner ring having a universal support on such collar for tilting movement relative thereto, and an outer ring journalled on such inner ring; linkage interconnecting the inner ring of the first mentioned wobble mechanism, the outer ring of the additional wobble mechanism, and the second wing; linkage anchoring means including a rod within said inner hollow shaft and which is axially adjustable along said axis; and linkage anchored on said rod and interconnecting the first mentioned wing and the outer ring of the first mentioned wobble mechanism.

5. A helicopter comprising a body; a set of wings rotatable in one direction about a drive axis; another set of wings rotatable in an opposite direction about said drive axis; a pair of wobble mechanisms about said drive axis each of which is mounted for axial adjustment along said drive axis; a linkage system connecting said wobble mechanisms with said wings and interconnecting said wobble mechanisms for simultaneous adjustment along said drive axis in either direction to adjust the pitch of said wings in opposite directions to effect turning of said body; a collective pitch control rod axially adjustable along said axis; said linkage including a link member pivotally anchored on said control rod and connected to one of said wing sets for effecting upon axial movement of said control rod additional pitch adjustment of such wing set in a direction opposite to that effected by axial adjustment of said wobble mechanisms, for altitude control; and control means for effecting selective simultaneous axial adjustment of said wobble mechanisms alone to effect turning of said body, or simultaneous axial adjustment of said wobble mechanisms together with said control rod to effect said altitude control.

6. A helicopter comprising a body; a set of wings rotatable in one direction about a drive axis; another set of wings rotatable in an opposite direction about said drive axis; a pair of wobble mechanisms about said drive axis each of which is mounted for axial adjustment along said drive axis; a linkage system connecting said wobble mechanisms with said wings and interconnecting said wobble mechanisms for simultaneous adjustment along said drive axis in either direction to adjust the pitch of said wings in opposite directions to effect turning of said body; a collective pitch control rod axially adjustable along said axis; said linkage including a link member pivotally anchored on said control rod and connected to one of said wing sets for effecting upon axial movement of said control rod additional pitch adjustment of such wing set in a direction opposite to that effected by axial adjustment of said wobble mechanisms, for altitude control; a pair of independently pilot operable control members; means for connecting one of said control members to said wobble mechanisms for effecting simultaneous axial adjustment of said wobble mechanisms alone to effect turning of said body; and means for connecting the other of said control members to said wobble mechanisms and to said control rod for effecting simultaneous axial adjustment of said wobble mechanisms together with said control rod to effect said altitude control.

STANLEY HILLER, JR.

REFERENCES CITED

The following references are of record in the file of this patent:

UNITED STATES PATENTS

| Number | Name | Date |
|---|---|---|
| 1,272,846 | Perry | July 16, 1918 |
| 1,454,944 | Pescara | May 15, 1923 |
| 1,800,470 | Oemichen | Apr. 14, 1931 |
| 1,836,406 | Smith | Dec. 15, 1931 |
| 1,912,354 | Pescara | May 30, 1933 |
| 1,919,089 | Breguet | July 18, 1933 |
| 1,940,108 | Sweet | Dec. 19, 1933 |
| 2,041,796 | Stalker | May 26, 1936 |
| 2,256,918 | Young | Sept. 23, 1941 |
| 2,256,635 | Young | Sept. 23, 1941 |
| 2,321,572 | Campbell | June 15, 1943 |
| 2,394,846 | Cox | Feb. 12, 1946 |

FOREIGN PATENTS

| Number | Country | Date |
|---|---|---|
| 155,985 | Austria | Apr. 25, 1939 |